June 5, 1923.

G. W. ALLEN

MUFFLER

Filed Sept. 18, 1919

1,457,809

Patented June 5, 1923.

1,457,809

UNITED STATES PATENT OFFICE.

GEORGE W. ALLEN, OF HYDE PARK, BOSTON, MASSACHUSETTS, ASSIGNOR TO B. F. STURTEVANT COMPANY, OF HYDE PARK, MASSACHUSETTS, A CORPORATION OF MASSACHUSETTS.

MUFFLER.

Application filed September 18, 1919. Serial No. 324,313.

*To all whom it may concern:*

Be it known that I, GEORGE W. ALLEN, a citizen of the United States, residing at Hyde Park, Boston, in the county of Suffolk and State of Massachusetts, have invented certain new and useful Improvements in Mufflers; and I do hereby declare the following to be a full, clear, and exact description of the invention, such as will enable others skilled in the art to which it appertains to make and use the same.

The present invention relates to sound absorbing devices or mufflers and more particularly to mufflers adapted to absorb the noise generated in a fan or blower.

It is the object of the present invention to provide a simple and compact type of muffler which may be attached to either the intake or the exhaust of the blower and which will dissipate the sound waves issuing from the blower without causing substantial interference with the flow of air to or from the blower.

With this object in view the several features of the invention consist in certain novel features of construction, combinations and arrangements of parts hereinafter described and claimed, the advantages of which will be obvious to those skilled in the art from the following description.

Figure 1:
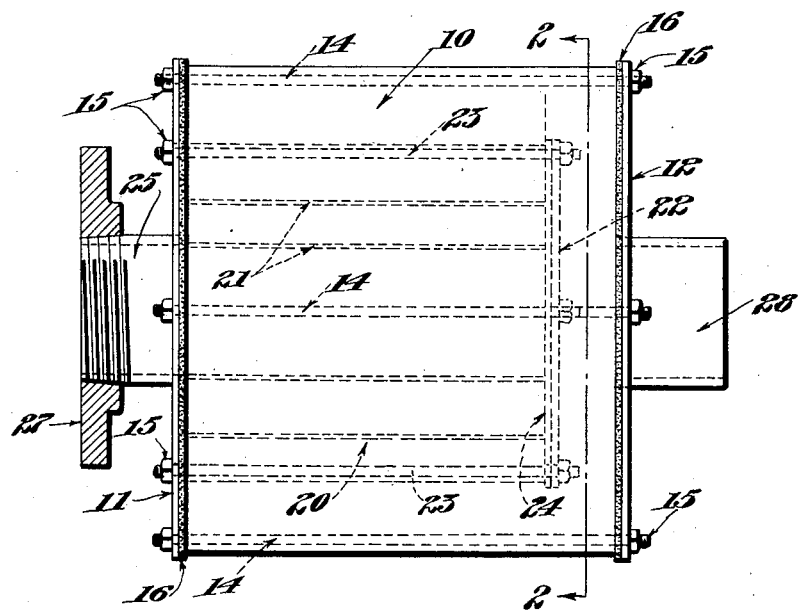
Figure 2:
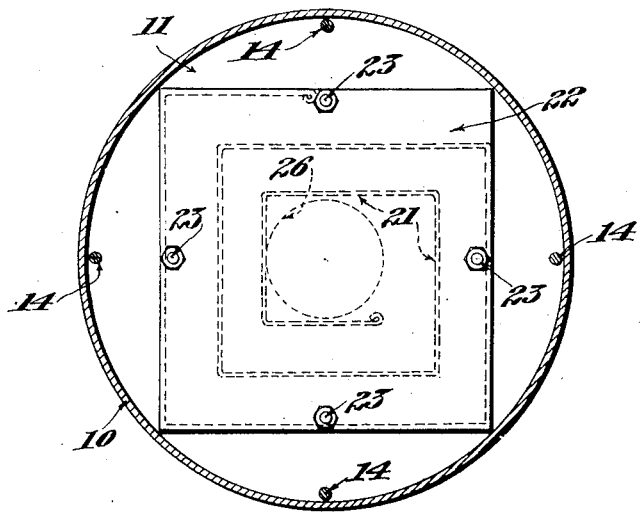

In the accompanying drawings illustrating the preferred form of the invention, Figure 1 is a side elevation of the muffler; and Fig. 2 is a cross section of the muffler taken upon the line 2—2 of Figure 1.

According to the present invention it is desired to dissipate the sound waves which are generated within a blower casing without substantially interfering with the air current passing in or out of the casing. As these sound waves are set up within the blower casing it is not sufficient, as in the ordinary form of muffler, to merely still the velocity of discharge of the air but some means must be provided for breaking up the sound waves which issue both from the inlet and discharge openings of the blower casing. The muffler in its illustrated embodiment may be applied either to the inlet or discharge of a blower casing, although in the preferred embodiment of the invention it is customarily applied to the intake opening of the blower as the discharge opening is ordinarily connected with a line of heavy piping which in and of itself serves to partially muffle the noise.

As shown in the illustrated embodiment of the invention, the muffler comprises generally a cylindrical outer casing 10 provided with end plates 11 and 12. The end plates and cylindrical casing are held in assembled relation by a plurality of tie bolts 14 passing through the end plates adjacent the peripheral edges. These tie bolts are threaded on opposite ends and provided with nuts 15, as shown clearly in Figure 1. In order to dampen any vibrations whic⁺ may be set up in the casing and air in absorbing the sound waves a mat or cushion 16 of felt or other material is interposed between the inner face of each end plate and the edge of the casing.

The sound waves issuing from the blower are made to pass first through a passage having the general form of a scroll consisting of a series of straight passages of gradually increasing length intersecting one another at right angles. After passing from the discharge end of the scroll the sound waves, if any remain, pass into an annular chamber formed by the outer cylindrical casing and thence outwardly from the muffler. It is found that by providing a scroll of this peculiar form, that is, a scroll having a rectangular cross section and made up of a series of straight passages at right angles to one another, the sound waves are caused to repeatedly impinge on the walls of the passage and are thus effectually dissipated so that the noise is absorbed within the muffler. This is probably due to the fact that the sound waves in moving along the straight passages forming the scroll continually break upon opposite sides of the passage and are thus interrupted and dissipated much better than with a spiral or other form of passage. As shown in the drawings, an inner scroll 20 is provided with a series of straight sides 21 extending at right angles and of gradually increasing length to form a continuous passage extending from approximately the center of the scroll outwardly to the periphery. The scroll is held in assembled relation within the outer cylindrical casing by an end plate 22 of rectangular form which clamps the scroll in position through a series of clamping rods 23 passing through the plate 22 and the end plate 11, as shown clearly in Figure 1. The plate 22 is also provided with a sheet of felt or other material 24 to dampen any vibrations which may be set up within the muffler.

It will be observed that with this construction when the muffler is attached to the intake opening of the blower the air current is moving counter to the direction of movement of the sound waves and that when the muffler is attached to the exhaust opening of the blower the air current is moving in the same direction as the sound waves. The muffler is provided with an intake pipe 25 having a circular orifice indicated at 26 which discharges into the inner portion of the scroll passage. The pipe 25 is provided with a flange 27 adapted to be connected with the corresponding flange formed upon either the intake or discharge openings of the blower or other apparatus. The opposite end of the muffler is provided with a pipe 28 located substantially centrally of the end plate 12, which acts as either an intake or discharge depending upon which side of the blower the muffler is attached.

This construction forms an exceedingly simple and efficient means for dissipating the sound waves generated in the operation of the blower and is capable of handling the necessary volumes of air without setting up a substantial back pressure.

While it is preferred to employ the specific construction and arrangements of parts shown and described, it will be understood that this construction and arrangement is not essential except so far as specified in the claims, and may be changed or modified without departing from the broader features of the invention.

The invention having been described, what is claimed is:

1. A muffler comprising an outer casing, an inner casing having the form of a scroll and consisting of a series of straight passages intersecting at right angles, and an inlet passage communicating with the center of the scroll.

2. A muffler comprising a scroll passage having a plurality of straight runs intersecting at right angles, an inlet passage communicating with the center of the scroll, and an annular chamber into which the sound waves discharge from the scroll.

3. A muffler comprising a cylindrical casing, end plates for the casing having inlet and outlet openings and a scroll comprising a series of straight passages secured within the cylindrical casing and communicating with the inlet opening.

4. A muffler comprising an outer casing, end plates for closing the casing, layers of sound absorbing material interposed between each of the end plates and the casing, tie bolts extending throughout the length of the casing for clamping the casing and end plates in assembled relation, and a scroll comprising a series of straight passages held within the casing and extending partially throughout the length thereof.

GEORGE W. ALLEN.